(12) United States Patent
Kämereit (10) Patent No.: US 11,667,064 B2
(45) Date of Patent: Jun. 6, 2023

(54) METHOD FOR PRODUCING A HOLLOW INJECTION-MOULDED PART

(71) Applicant: GERRESHEIMER REGENSBURG GMBH, Regensburg (DE)

(72) Inventor: Markus Kämereit, Nottuln (DE)

(73) Assignee: GERRESHEIMER REGENSBURG GMBH, Regensburg (DE)

( * ) Notice: Subject to any disclaimer, the term of this patent is extended or adjusted under 35 U.S.C. 154(b) by 104 days.

(21) Appl. No.: 16/562,655

(22) Filed: Sep. 6, 2019

(65) Prior Publication Data

US 2020/0078996 A1    Mar. 12, 2020

(30) Foreign Application Priority Data

Sep. 7, 2018 (DE) .......................... 102018121835.4

(51) Int. Cl.
*B29C 45/16* (2006.01)
*B29C 45/14* (2006.01)
(Continued)

(52) U.S. Cl.
CPC .... *B29C 45/1615* (2013.01); *B29C 45/14467* (2013.01); *B29C 45/162* (2013.01);
(Continued)

(58) Field of Classification Search
None
See application file for complete search history.

(56) References Cited

U.S. PATENT DOCUMENTS 5,312,577 A * 5/1994 Peterson ............... B29C 70/766
264/154
9,381,687 B2 7/2016 Felts et al.
(Continued)

FOREIGN PATENT DOCUMENTS

CN    201872306    6/2011
CN    104470565    3/2015
(Continued)

OTHER PUBLICATIONS

Translation of Vogl et al. (DE 10 2016 118 768 A1), Apr. 5, 2018 (Year: 2018).*

(Continued)

*Primary Examiner* — Benjamin A Schiffman
(74) *Attorney, Agent, or Firm* — Sheridan Ross PC (57) ABSTRACT

The invention relates to a method for producing a hollow injection-moulded part, in particular a primary packaging means for medical applications by an injection moulding method, comprising the following method steps:

a) Providing a first female die tool having a first mould cavity and a mould core formed as a male die tool;

b) Introducing a mould core into the first mould cavity so that a first cavity is formed and the mould core extends beyond the mould cavity in the axial direction (X), thereby bringing the mould core into operative contact with the first female die tool and/or with a receiving member;

c) Injecting a first plastic material into the first cavity so that a first portion of the injection-moulded part is formed;

d) Transferring the first portion of the injection-moulded part to a second cavity;

e) Injecting a second plastic material into the second cavity so that a second portion is formed directly on the first portion of the injection-moulded part.

13 Claims, 4 Drawing Sheets

(51) Int. Cl.
    *B29C 45/26*    (2006.01)
    *B29C 45/36*    (2006.01)
    *B29D 22/00*    (2006.01)
    *B29C 33/38*    (2006.01)
    *B22D 17/22*    (2006.01)
    *B29L 31/00*    (2006.01)
    *B29C 33/76*    (2006.01)

(52) U.S. Cl.
    CPC ........ *B29C 45/1635* (2013.01); *B29C 45/261* (2013.01); *B29C 45/36* (2013.01); *B29D 22/003* (2013.01); *B22D 17/22* (2013.01); *B29C 33/38* (2013.01); *B29C 33/76* (2013.01); *B29C 2045/14524* (2013.01); *B29L 2031/7544* (2013.01)

(56) References Cited

U.S. PATENT DOCUMENTS

| | | | |
|---|---|---|---|
| 10,022,148 B2 * | 7/2018 | Fischvogt | B29C 45/1639 |
| 2008/0102235 A1 | 5/2008 | Skigen et al. | |
| 2011/0254202 A1 | 10/2011 | Aeschlimann | |
| 2013/0200549 A1 | 8/2013 | Felts et al. | |
| 2018/0207324 A1 * | 7/2018 | Auerbach | A61L 31/06 |

FOREIGN PATENT DOCUMENTS

| | | | | |
|---|---|---|---|---|
| CN | 105873741 | | 8/2016 | |
| DE | 202014104871 | | 1/2016 | |
| DE | 102016118767 A1 * | 4/2018 | | A61M 5/178 |
| DE | 102016118768 | | 4/2018 | |
| DE | 102017119225 B4 * | 3/2021 | | A61J 1/1425 |
| EP | 3127677 | | 2/2017 | |
| EP | 3446849 A1 * | 2/2019 | | A61J 1/1406 |
| WO | WO 79/01111 | | 12/1979 | |
| WO | WO 2014/105661 | | 7/2014 | |

OTHER PUBLICATIONS

"Temper, v." OED Online. Oxford University Press, Sep. 2021. Web. Sep. 22, 2021. (Year: 2021).*
Extended Search Report for European Patent Application No. 19194409.9, dated Feb. 10, 2020, 4 pages.
Official Action for German Patent Application No. 102018121835.4, dated Feb. 19, 2019, 3 pages.
Official Action with English Translation for China Patent Application No. 201910841586.7, dated Apr. 21, 2021, 16 pages.
Official Action with machine translation for European Patent Application No. 19194409.9, dated May 21, 2021, 8 pages.
Official Action for European Patent Application No. 19194409.9, dated Sep. 3, 2020, 3 pages.
Official Action with English Translation for China Patent Application No. 201910841586.7, dated Dec. 2, 2021, 16 pages.
Official Action with machine translation for German Patent Application No. 102018121835.4, dated Mar. 4, 2022, 7 pages.

* cited by examiner

METHOD FOR PRODUCING A HOLLOW INJECTION-MOULDED PART

CROSS-REFERENCE TO RELATED APPLICATIONS

This application claims the benefit of German Patent Application No. DE 10 2018 121 835.4 filed Sep. 7, 2018, the disclosure of which is incorporated herein by reference in its entirety.

FIELD

The invention relates to a method and an apparatus for producing a hollow injection-moulded part by an injection moulding method.

BACKGROUND

Such hollow injection-moulded parts are intended in particular to constitute primary packaging means for medical applications. These are in particular syringe bodies. However, such primary packaging means may also be vials, ampoules or medical containers. Such primary packaging means are generally designed as elongated hollow cylinders and are made of a thermoplastic plastic. Usually, such primary packaging means are produced by an injection moulding process. In this case, a mould core is introduced into a mould cavity, whereby a cavity is defined. The injection-moulded part, or the primary packaging means, is then formed by injecting a plastic material. In this context, one refers to production by means of a single shot.

However, in the case of particularly thin and/or long primary packaging means, for example in the case of fine-dose syringes with a receiving volume of 0.01 ml, the problem arises that the mould core is susceptible to breakage and, moreover, can only be poorly cooled. Such a mould core must be designed to be correspondingly long and thin. However, mechanical as well as thermal forces act on the mould core, so that it is exposed to an increased risk of breakage. Moreover, it is possible that the end of the mould core projecting into the mould cavity is no longer disposed centrally in the mould cavity, due to certain material tolerances or due to certain forces acting thereon, for example, gravitational forces. This would be followed by a change in the wall thickness of the primary packaging means. Such primary packaging means would then have to be sorted out accordingly.

Furthermore, the configuration of the distal end of the packaging means is in many cases limited by the fact that the injection mould tool or mould tool can only be configured to a limited extent.

Finally, if a syringe body with an integrated piercing means, such as a cannula of a needle, or the like is produced, the correspondingly precise placement of this piercing means in the tool will be difficult in the case of the aforementioned elongated and/or thin syringe bodies.

SUMMARY

The problem underlying the invention is accordingly to provide a method or an apparatus for producing a hollow injection-moulded part, in particular a primary packaging means for medical applications by an injection moulding process, which solves the problems mentioned above.

The object is achieved by a method for producing a hollow injection-moulded part, in particular a primary packaging means for medical applications, by an injection moulding method comprising the following method steps:

a) Providing a first female die tool having a first mould cavity and a mould core formed as a male die tool;
b) Introducing a mould core into the first mould cavity so that a first cavity is formed and the mould core extends beyond the mould cavity in the axial direction (X), thereby bringing the mould core into active contact with the first female die and/or with a receiving member;
c) Injecting a first plastic material into the first cavity so that a first portion of the injection-moulded part is formed;
d) Transferring the first portion of the injection-moulded part to a second cavity;
e) Injecting a second plastic material into the second cavity, so that a second portion is formed directly on the first portion of the injection-moulded part.

The use of such a multi-component injection moulding method results in a large number of options for configuring the second portion of the injection-moulded part, which represents, for example, the distal portion of a syringe body. Such a large number is achieved by the repeated injection of a second plastic material. Requirements which are particularly relevant to the first portion of the injection-moulded part, which concern, for example, the container of the syringe body in which the medium is to be stored and the proximal portion of the syringe body, which may for example comprise a finger flange, no longer have to be considered for the shaping of the second portion because this has already been produced.

Furthermore, the arrangement of the mould core can be stabilized by the protruding out or the operative contact of the mould core with the first female die and/or the receiving element. This is particularly advantageous for particularly long and/or thin primary packaging means, since the mould core must be designed to be correspondingly long and/or thin and thus does not have sufficient mechanical stability.

According to a particularly preferred embodiment, the mould core is cylindrical. Advantageously, the mould core is centrally introduced into the first mould cavity, so that a gap between a shell surface of the mould core and an inner wall surface of the first mould cavity define a wall thickness of the injection-moulded part. The first cavity is therefore the space of the first mould cavity which is not filled by the mould core.

Advantageously, the first mould cavity is cylindrical. The first mould cavity advantageously has a first axial opening and a second axial opening, wherein, in step b), the mould core is introduced into the mould cavity through the first axial opening. The mould core then passes through the second opening and thus protrudes in its end position in the axial direction beyond the mould cavity.

Preferably, the first female die tool has, at the second axial opening of the first mould cavity, an end wall which extends inward in the radial direction. After insertion of the mould core, this end wall preferably abuts the mould core, so that the first cavity is delimited in the axial direction (X) by this end wall.

According to a further preferred embodiment, the first female die tool on the first axial opening of the first mould cavity has an end wall which extends in the radial direction inwardly. Alternatively, it is also possible that the mould core is designed to complete the first cavity accordingly.

According to a further aspect of the invention, an axial portion of the first cavity is formed by the gap between a shell surface of the mould core and an inner wall surface of the first mould cavity. In addition, a radial portion of the first cavity may be formed by the gap between a shell surface of the mould core and the first female die tool. By such a radial portion, for example, a finger flange of a syringe body can be formed by the injection of the first plastic.

According to a further preferred aspect of the invention, the mould core has a first end portion and a second end portion. Preferably, the end portions are opposite in the axial direction (X). The second end portion is introduced into the first mould cavity in step b). In the end position of the mould core, this second end portion protrudes beyond the mould cavity in the axial direction (X), the end position being the position in which the mould core is located during the injection of the first plastic. Preferably, the mould core is introduced into the first mould cavity only to the extent that the first end portion also protrudes beyond the mould cavity. Accordingly, both the first and the second end portion advantageously protrude in the axial direction (X) beyond the first mould cavity. The second end portion is preferably in operative contact with the first female die tool and/or with the receiving element. This is done as soon as the mould core is in its final position. The end position is to be understood as the position which the mould core occupies when injecting the first plastic.

According to a further advantageous aspect of the invention, the operative contact is a form fit. Preferably, the form fit is effected by the mould core being received in a receiving recess. The receiving recess is further preferably arranged centrally to the first mould cavity. The receiving recess may preferably be arranged in the first female die tool and/or in the receiving element. Advantageously, the first end portion of the mould core is arranged on a holding device which is aligned with the receiving recess. An optimal centring of the mould core in the first mould cavity is thus made possible, whereby a uniform wall thickness of the injection-moulded part is ensured.

Preferably, the first plastic material is injected through a first injection nozzle into the first mould cavity. In general, the injection nozzle is at one end of the cavity, that is, approximately at the first or second axial opening of the mould cavity. The injection is therefore advantageously performed in the axial direction (X). This is to prevent a mould core misalignment caused by the injection pressure. Due to the advantageous mutual mounting of the mould core in the receiving recess and in the holding device, the injection nozzle can be arbitrarily placed, so for example, on a side wall of the first mould cavity. A mould core misalignment by the injection pressure is effectively prevented by the mutual mounting.

After injection of the first plastic into the first cavity, the first portion of the injection-moulded part is arranged on the mould core. Since a predetermined protruding section of the second end portion of the mould core protruded beyond the first mould cavity, it is not covered with the first plastic material.

According to another aspect of the invention, the operative contact is a thermal contact. Preferably, a tempering of the mould core takes place both via its first end portion and its second end portion. After injection of the first or second plastic into the respective cavity, the injection-moulded part solidifies through a cooling of the surrounding mould parts, such as the mould core. Since the mould core must also be dimensioned for particularly long and/or thin injection-moulded parts, cooling which acts only from one side onto the mould core is not sufficiently effective. By the operative contact of the second end portion, a tempering or cooling can emanate both from the first end portion and from the second end portion of the mould core. A corresponding tempering device can therefore preferably be provided in the first female die tool and/or with the receiving element.

As a result of the cooling, the injection-moulded part experiences a corresponding shrinkage, as a result of which it demoulds from the mould cavity. In order to avoid the injection-moulded part shrinking on the mould core, the mould core may preferably be tempered accordingly after the injection-moulded part has solidified. The temperature of the mould core can be increased or decreased. Since the injection-moulded part and the mould core have different coefficients of expansion, a corresponding demoulding gap is advantageously produced between the mould core and the injection-moulded part by the tempering.

The tempering of the mould core can preferably be carried out inductively, electrically or by means of a tempering fluid. A tempering fluid may be a gas, for example $CO_2$ or a liquid, such as water or an oil.

According to a further aspect of the invention, the second cavity is formed by introducing at least one portion of the mould core into a second female die tool having a second mould cavity. Accordingly, providing a second female die tool with a second mould cavity as a method step would also be advantageous. Preferably, the second cavity is formed by the protruding region of the mould core and the second mould cavity.

The mould core is preferably introduced into the second mould cavity in such a way that at least the protruding region of the mould core and the predetermined region of the first portion are located in the second mould cavity. Preferably, a predetermined area of the first portion of the injection-moulded part bears against an inner surface of the second mould cavity. Accordingly, the second plastic material would be moulded directly subsequent to the first portion of the injection-moulded part in the axial direction (X).

Alternatively, it would be possible for a predetermined region of the first portion of the injection-moulded part to be located in the cavity such that the second plastic material is formed directly on the predetermined region or the first section of the injection-moulded part both in the radial direction (R) and in the axial direction (X).

The predetermined region of the first portion of the injection-moulded part is advantageously chosen such that a corresponding forming of the second portion of the injection-moulded portion of the second cavity is ensured.

However, it would also be conceivable for the mould core to be introduced into the second mould cavity in accordance with the length of the first portion, so that the complete first portion of the injection-moulded part is located in the second mould cavity. In this case, the first portion of the injection-moulded part would advantageously abut against an inner surface of the second mould cavity. The second portion is then directly moulded in the axial direction (X) on the first portion.

Advantageously, the mould core is centrally introduced into the second mould cavity, so that a distance between a shell surface of the protruding region of the mould core and an inner wall surface of the second mould cavity define a second cavity or the wall thickness of the second portion of the injection-moulded part. The tempering fluid can, for example, be passed through corresponding channels through the mould core.

More preferably, the second mould cavity is formed as a hollow cylinder, which is closed with an end wall. Advantageously, the second injection nozzle z is arranged in this end wall. However, the invention is not limited to such an embodiment. The second injection nozzle may be arbitrarily placed; for example, it may also be arranged on a side wall of the second mould cavity.

Preferably, the first mould cavity and the second mould cavity are part of the same mould tool. It would also be conceivable that the two mould cavities are each part of a separate mould tool. The transfer of the injection-moulded part would thus also include a transfer into another mould tool.

According to a further advantageous embodiment, the second cavity has a further injection mould tool. Preferably, the further injection mould tool comprises two mould tool halves which can be displaced relative to one another and which have a recess. Preferably, in the closed state of the further injection mould tool, i.e. when the mould tool halves abut against one another, these recesses form the second cavity. Advantageously, an opening is further provided through which a portion of the mould core and/or a predetermined region of the first portion of the injection-moulded part can be introduced into the second cavity. By such a configuration, the second portion of the injection-moulded part can be configured arbitrarily.

Accordingly, the second plastic material can be directly formed on the first portion of the injection-moulded part only in the axial direction (X). It is also conceivable that the second plastic material is formed directly both in the radial direction (R) and in the axial direction (X) on the predetermined region or the first portion of the injection-moulded part.

According to a further preferred embodiment, in step d), the first portion of the injection-moulded part is transferred to the second cavity by means of the mould core. Preferably, the protruding region of the second end portion of the mould core and/or a predetermined region of the first portion of the injection-moulded part are thereby introduced into the second cavity.

Preferably, the first mould cavity and the second mould cavity or the further injection mould are arranged in a stationary element of the mould tool; that is, these elements are formed immovably.

Preferably, the mould core is arranged by means of the holding device on a movable element which is displaceable relative to the stationary element such that the mould core can be moved perpendicular to the opening plane of the first or second mould cavity or the opening in the further injection mould tool. The movable element is preferably driven hydraulically or electromechanically.

It would also be conceivable to arrange a plurality of first or second mould cavities or further injection mould tools in the stationary element. Accordingly, several mould cores would then be provided on the movable element. Thus, several injection-moulded parts can be produced in a single work cycle.

According to a further advantageous aspect of the invention, the mould core is removed at least in sections from the first portion of the injection-moulded part before step d).

The mould core can therefore be completely removed from the injection-moulded part. The injection-moulded part would thus be transferred by means of a further transfer device to the second cavity.

However, it is also conceivable that the mould core is only removed in sections from the injection-moulded part. Advantageously, the mould core is displaced so far into the injection-moulded part that the transition region is completely in the injection-moulded part or its second end is flush with the corresponding end of the first portion of the injection-moulded part. Accordingly, the first portion of the injection-moulded part can be introduced into the second mould cavity by means of the mould core. However, the mould core does not protrude into the second mould cavity, so that no second plastic material can be sprayed onto it.

According to a further advantageous aspect of the invention, an insert component is arranged in the second cavity, which is overmoulded with the second plastic. Preferably, the insert component is a metallic insert component in the form of a piercing means. A piercing means may be a needle, a cannula or the like. Thus, in particular syringe bodies can be produced, which have a so-called "staked in" needle.

Preferably, the second cavity has a holding device for the insert component. Such a holding device may be a clamping device, a magnetic holding device or the like.

Preferably, the second plastic material is injected through a second injection nozzle into the second cavity. The second injection nozzle may be arranged on both a radial and on an axial side wall of the second mould cavity.

According to a further preferred embodiment, an insert component is arranged in the second cavity, which is provided with an adapter element. Preferably, the adapter element is overmoulded with the second plastic. The use of such adapter elements, also called hubs, is advantageous if needles with a very small outlet width, for example, ophthalmic needles are to be used. Due to the small dimensions of the needle, a holder in the second cavity for said needle presents difficulties. This can lead, for example, to damage to the needle sharpening. By providing an adapter element on the needle, a holder can be made via the adapter element.

The plastic material to be injected is preferably plasticised in a plasticising unit. Such a plasticising unit comprises, inter alia, a plasticising cylinder with a screw and heating elements. The plasticised plastic material is then preferably fed via a sprue to the corresponding cavity.

According to a further advantageous concept of the invention, the first plastic material is injected into the first cavity, and/or the second plastic material is injected into the second cavity via a respective hot runner. The leading sprue from the plasticising unit to the respective injection nozzle system is thereby advantageously thermally insulated from the mould. In other sprue systems, the plastic material solidifies in the sprue system. The so-called sprue must then be separated from the moulded part. This requires additional tools. Furthermore, the additional plastic material must be disposed of. When using a hot runner, the sprue system is kept at a correspondingly high temperature, so that the sprue does not solidify.

In the injection phase, the plasticized plastic material is injected via the first injection nozzle into the respective cavity under a high pressure. The pressure is preferably between a value of about 1 MPa and about 200 MPa. The plasticised plastic material preferably has a temperature between 100° C. and 400° C. during injection. However, the cavity-forming elements have a lower temperature of preferably between 80° C. and 120° C. Upon contact with the comparatively cold wall regions of the cavities, the plastic solidifies upon reaching the solidification point of the respective material. In order to ensure the most homogeneous possible distribution of the plastic material in the cavity, the plastic material must be introduced correspondingly quickly into the cavity. The injection speed is preferably between 5 ccm/s and 40 ccm/s.

After injection, a holding pressure in a range between 10 MPa and 50 MPa, more preferably in a range between 20 MPa and 40 MPa, particularly preferably at about 30 MPa, is preferably maintained. The holding pressure is used to compensate for excessive shrinkage, i.e. the thermally induced volume reduction of the injected moulded part.

According to another aspect of the invention, the first and second plastic materials are the same plastic materials. Alternatively, the first and the second plastic material are different materials, which, however, enter into a material fit.

Preferably, the first and/or the second plastic material is a polymer plastic, preferably of a polyolefin, for example polypropylene or polyethylene, more preferably of a cyclo-olefin polymer (COP) or of a cyclo-olefin copolymer (COC). COC is, in contrast to the partially crystalline polyolefins, such as polyethylene and polypropylene, amorphous and thus transparent. Such plastics are characterised in that they have excellent biocompatibility, in particular blood compatibility and extremely low water absorption/water vapor permeability. Furthermore, these plastics show no reaction with the usual drugs used.

The object underlying the invention is further achieved by an apparatus for producing an elongated, hollow-shaped injection-moulded part, in particular a primary packaging means for medical applications. The apparatus according to the invention comprises a first female die tool having a first mould cavity and a mould core formed as a male die tool, which has a first end portion and a second end portion, wherein the mould core may be arranged in the first mould cavity, so that both the first and the second end portion protrude beyond the first mould cavity in the axial direction (X), whereby the second end portion is in operative contact with the first female die tool and/or with a receiving element.

Advantageous further embodiments of the apparatus for producing a hollow injection-moulded part correspond to the advantageous embodiments of the method for producing a hollow injection-moulded part.

The object underlying the invention is further achieved by a hollow injection-moulded part, in particular a primary packaging means for medical applications, produced according to a method for producing a hollow injection-moulded part according to the said advantageous embodiments, preferably produced in an apparatus for producing a hollow injection-moulded part according to the said embodiments.

According to a particular preferred embodiment, the hollow injection-moulded part is a syringe body. Preferably, the first portion of the injection-moulded part substantially corresponds to the container for the medium to be stored in the syringe. Advantageously, a finger flange is provided on the container.

According to a preferred embodiment, the second portion of the injection-moulded part is a cone-shaped connecting element, for example a Luer cone.

According to a further preferred embodiment, the second portion is a piercing means, for example a needle or a cannula, which is overmoulded by the second plastic.

BRIEF DESCRIPTION OF THE DRAWINGS

Other advantages, aims and properties of the present invention are explained with reference to the following description of the attached drawings. Similar components may have the same reference signs in the various embodiments.

In the drawings.

DETAILED DESCRIPTION

FIGS. 1 to 6 show a method for producing a hollow injection-moulded part (100, 100a), in particular a primary packaging means for medical applications, and a corresponding apparatus (24) for producing a hollow injection-moulded part (100, 100a). The method comprehensively comprises the following method steps:

a) Providing a first female die tool (1) having a first mould cavity (2) and a mould core (3) formed as a male die tool;

b) Introducing a mould core (3) into the first mould cavity (2), so that a first cavity (4) is formed and the mould core (3) protrudes beyond the mould cavity (2) in the axial direction (X), whereby the mould core (3) is brought into operative contact with the first female die tool (1) and/or with a receiving element (5);

c) Injecting a first plastic material into the first cavity (4), so that a first portion (101) of the injection-moulded part (100, 100a) is formed;

d) Transferring the first portion (101) of the injection-moulded part (100, 100a) to a second cavity (6);

e) Injecting a second plastic material into the second cavity (6) so that a second portion (102) is formed directly on the first portion (101) of the injection-moulded part (100, 100a).

The apparatus (24) for producing a hollow-shaped injection-moulded part (100, 100a), in particular for production by a method according to any one of claims 1 to 12, comprises a first female die tool (1) having a first mould cavity (2) and a mould core (3) formed as a male die tool, which has a first end portion (10) and a second end portion (11), wherein the mould core (3) may be arranged in the first mould cavity (2) so that both the first (10) and the second end portion (11) protrude beyond the first mould cavity (2) in the axial direction (X), whereby the second end portion (11) is in active contact with the first female die tool (1) and/or with a receiving element (5).

The mould core (3) is cylindrically shaped, in particular as a circular cylinder. As can be seen from FIGS. 1 to 3, the mould core (3) is introduced centrally into the first mould cavity (2) of the first female die tool (1).

Figure 1:
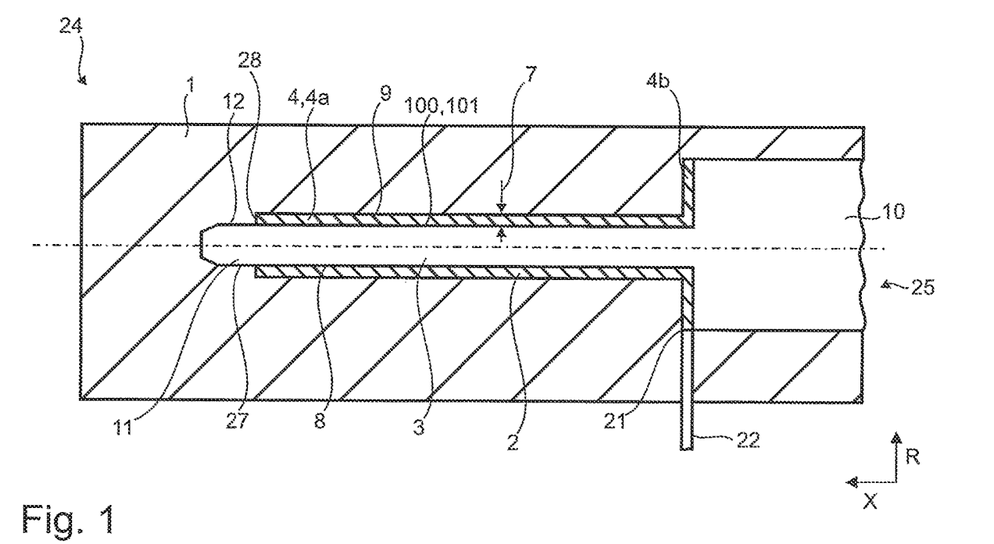
FIG. 1 is a sectional view of an apparatus for producing a hollow injection-moulded part.
Figure 2:
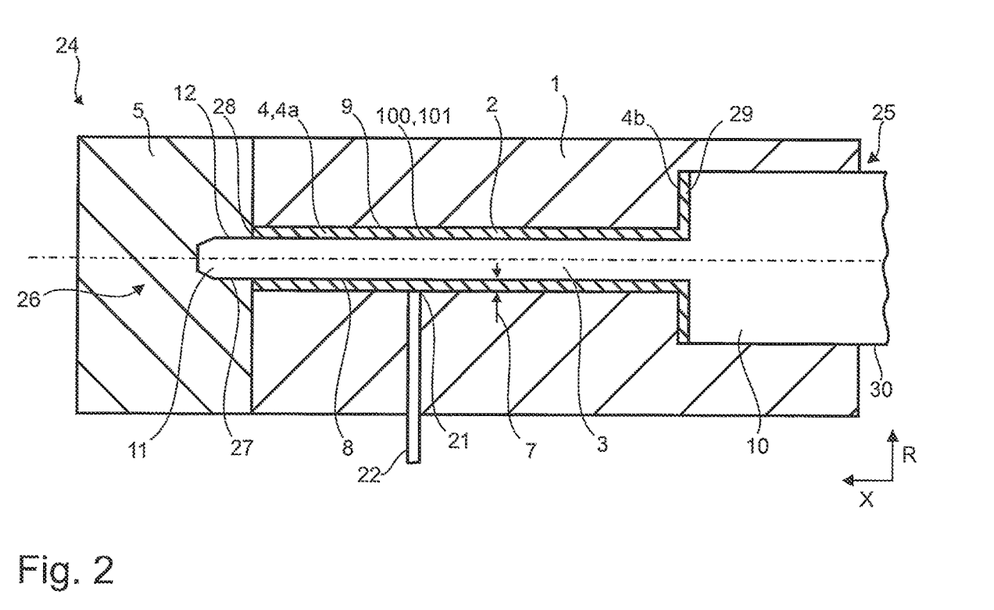
FIG. 2 is a sectional view of an apparatus for producing a hollow injection-moulded part according to a further embodiment.
Figure 3:
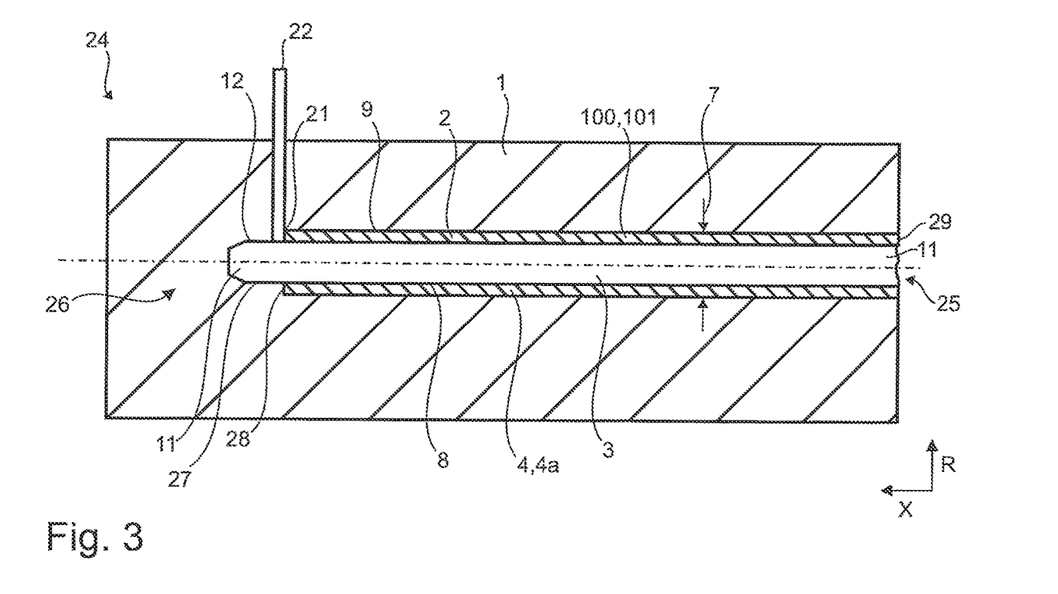
FIG. 3 is a sectional view of an apparatus for producing a hollow-shaped injection-moulded part according to another embodiment.

A distance (7) between a shell surface (8) of the mould core (3) and an inner wall surface (9) of the first mould cavity (2) define a wall thickness (103) of the injection-moulded part (101) after the injection of the first plastic material. In this case, an axial portion (4a) of the first cavity (4) forms the distance (7) between a shell surface (8) of the mould core (3) and an inner wall surface (9) of the first mould cavity (3).

The first mould cavity (2) has a first axial opening (25) and a second axial opening (26). In step b), the mould core (3) is introduced into the mould cavity (2) through the first axial opening (25). In its end position, i.e. in the position in which the injection of the first plastic material takes place, the second end portion (11) of the mould core (3) projects through the second axial opening (26). This predetermined region (27) of the second end portion (11) of the mould core (3) protruding from the mould cavity (2) is thus not covered thereby during the injection of the first plastic material.

For this purpose, the first female die tool (1) has at the second axial opening (26) of the first mould cavity (2) an end wall (28) which extends inward in the radial direction (R). After the introduction of the mould core (3), this end wall (28) lies thereupon so that the mould cavity (2) is closed in the axial direction (X). In the embodiment according to FIG. 3, the first female die (1) has an end wall (28) both at the second axial opening (26) of the first mould cavity (2) and an end wall (29) at the first opening (25) of the first mould cavity (2) which extend inward in the radial direction (R). After the introduction of the mould core (3), these end walls (28, 29) lie thereupon so that the mould cavity (2) is closed.

In addition, a radial portion (4b) of the first cavity (4) can be formed by the distance (7) between a shell surface (8) of the mould core (3) and the first female die tool (1). However, the radial portion (4b) of the first cavity (4) can also be completely or partially closed by an end wall (29), as shown for example in FIG. 2. By such a radial portion (4b), a finger flange (109) of a syringe body (100a) may be formed.

The operative contact of the mould core (3) with the first female die tool (1) and/or with the receiving element (5) is a form fit. This form fit is made by receiving the mould core (3) in a receiving recess (12). This receiving recess (12) is arranged centrally to the first mould cavity (2). According to the embodiment according to FIGS. 1 and 3, this receiving recess (12) can be arranged in the first female die tool (1). FIG. 2 shows an embodiment in which the receiving recess (12) is arranged in the receiving element (5).

The first end portion (10) of the mould core (3) is arranged on a holding device (30) which is aligned with the receiving recess of the first female die tool (1) and/or with the receiving element (5). An optimal centring of the mould core (3) in the first mould cavity (2) is thereby made possible, whereby a uniform wall thickness (103) of the injection-moulded part (100, 100a) is ensured.

Furthermore, the operative contact is a thermal contact. The tempering of the mould core (3) may thus take place both via its first end portion (10) and its second end portion (11), wherein the tempering of the mould core (3) can be performed inductively, electrically or by means of a tempering fluid.

The second cavity (6) can be formed by introducing at least one portion of the mould core (3) into a second female die tool (13) with a second mould cavity (14). This can be seen in FIGS. 4 and 5, for example. Here, the protruding region (27) of the mould core (3) is introduced into the second mould cavity, whereby the second cavity (6) is formed. However, it is also conceivable for a predetermined area of the first portion (101) of the injection-moulded part (100) to be introduced into the second mould cavity (14). In this case, the second portion (102) of the injection-moulded part (100) is directly moulded onto the first one in the radial direction and/or in the axial direction.

Figure 4:
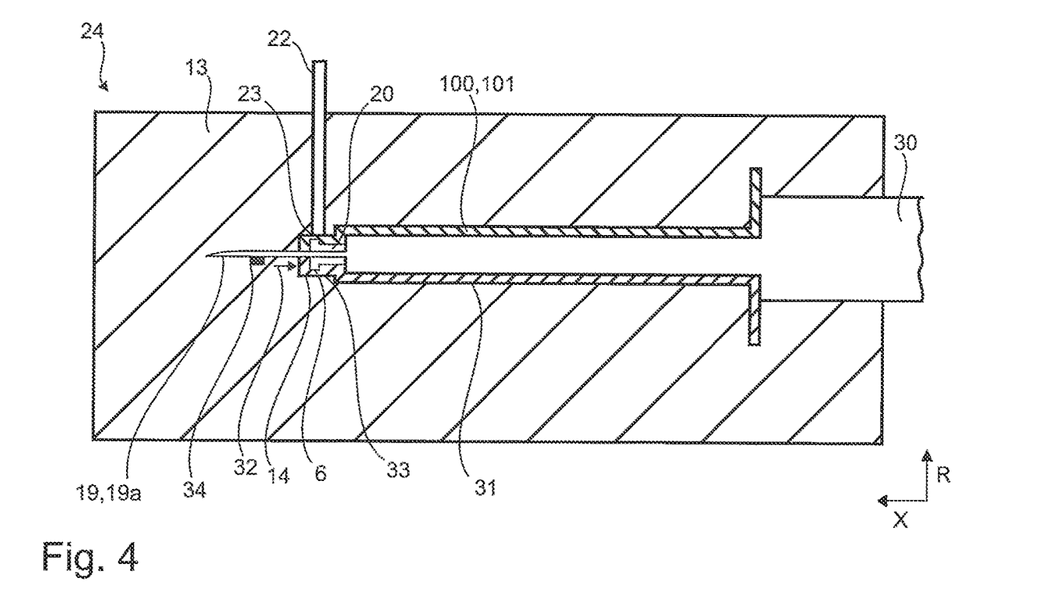
FIG. 4 is a sectional view of an apparatus for producing a hollow injection-moulded part according to a further embodiment.
Figure 5:
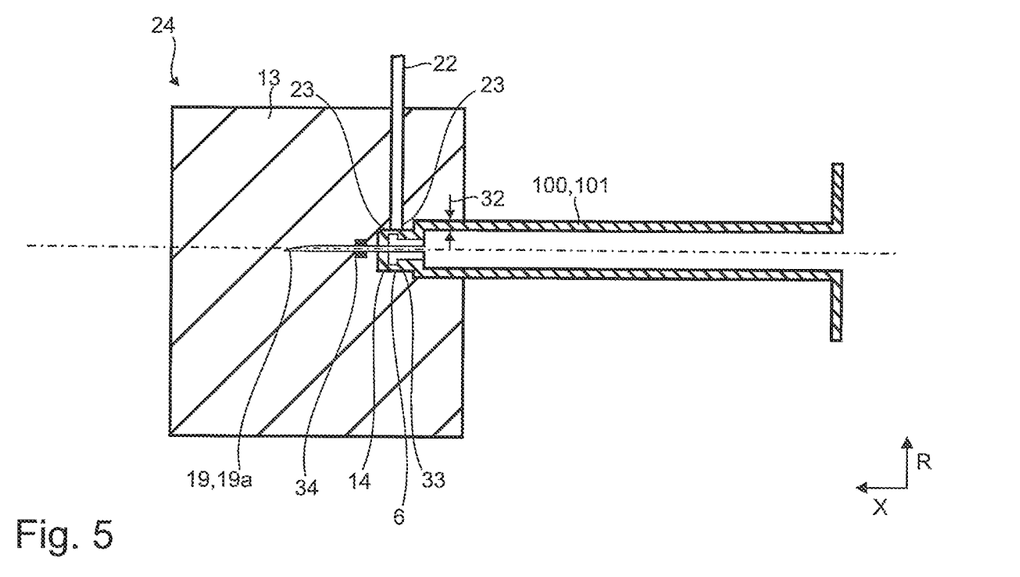
FIG. 5 is a sectional view of an apparatus for producing a hollow-shaped injection-moulded part according to another embodiment.

However, it would also be conceivable for the mould core (3) to be introduced into the second mould cavity (14) corresponding to the length of the first portion (101), so that the complete first portion (101) is located in the second mould cavity (14). In this case, advantageously, the first portion (101) of the injection-moulded part (100) would abut against an inner surface (31) of the second mould cavity (14).

The mould core (3) is introduced centrally into the second mould cavity (14). A distance (32) between a shell surface (8) of the protruding region (27) of the mould core (3) and an inner wall surface (32) of the second mould cavity (14) defines the second cavity (6) and the wall thickness of the second portion (102) of the injection-moulded part (100).

The second mould cavity (14) may be formed as a hollow cylinder, which may be closed with an end wall.

Figure 6:
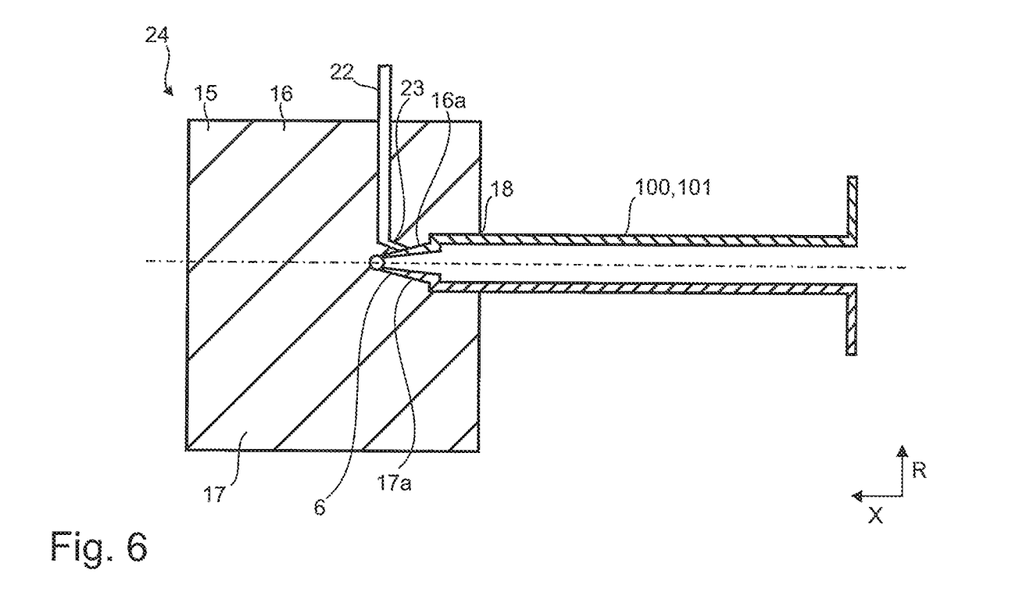
FIG. 6 is a sectional view of an apparatus for producing a hollow-shaped injection-moulded part according to another embodiment.

According to the embodiment according to FIG. 6, the second cavity (6) is arranged in a further injection mould tool (15). The further injection mould tool (15) comprises two mould tool halves (16, 17) which can be displaced relative to one another and which have a recess (16a, 17a), wherein, in the closed state of the further injection mould tool (15), these recesses (16a, 17a) form the second cavity (6). In the further injection mould (15), an opening (18) is provided through which a portion of the mould core (3) and/or a predetermined region of the first portion (101) of the injection-moulded part (100, 100a) can be introduced into the second cavity (6).

The first portion (101) of the injection-moulded part (100) can be transferred by means of the mould core (3) to the second cavity (6) or by means of a further transport device, for example a gripping element. It is also conceivable that, before step d), the mould core (3) is removed at least in sections from the first portion (101) of the injection-moulded part (100, 100a).

According to the embodiments according to FIGS. 4 and 5, an insert component (19, 19a) which is overmoulded with the second plastic, is arranged in the second cavity (6), wherein the insert component (19, 19a) is a metallic insert component in the form of a piercing means (19a). The insert component (19, 19a) can be fixed in the second cavity (6) by a holding device (34).

It is also conceivable that an insert component (19, 19a), which is provided with an adapter element (20), is arranged in the second cavity (6), wherein the adapter element (20) is overmoulded with the second plastic.

The first plastic material is injected into the first cavity (4) via a first injection nozzle (21). The second plastic material is injected into the second cavity (6) via an injection nozzle (23). The respective plastic material is supplied via a hot runner (22) of the first (21) and second injection nozzle (23).

Figure 7:
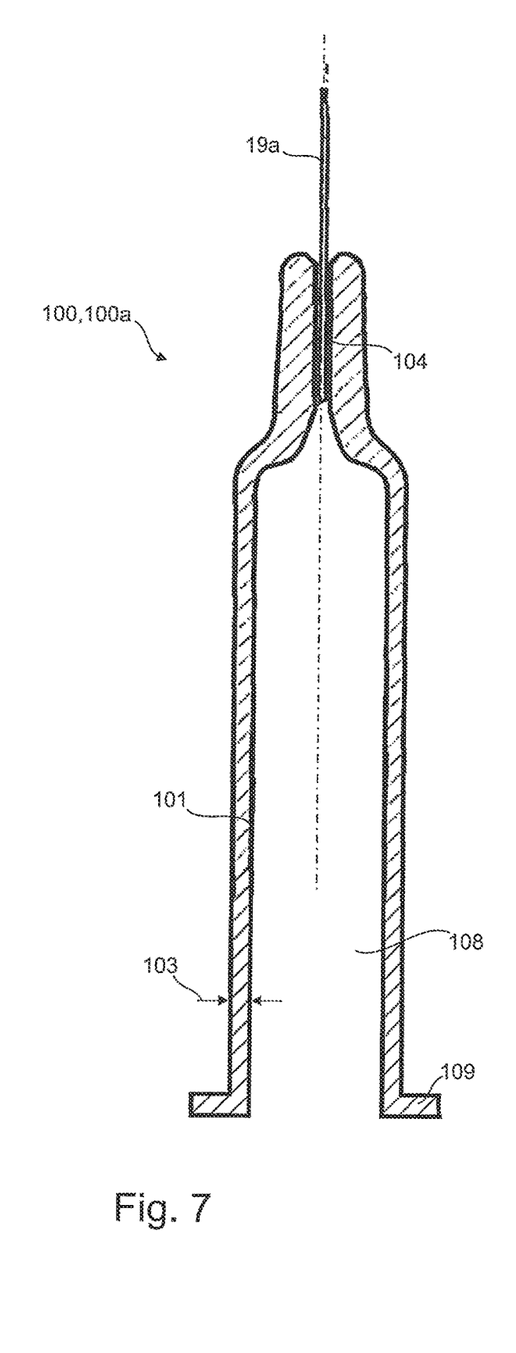
FIG. 7 is a sectional view of a hollow injection-moulded part.
Figure 8:
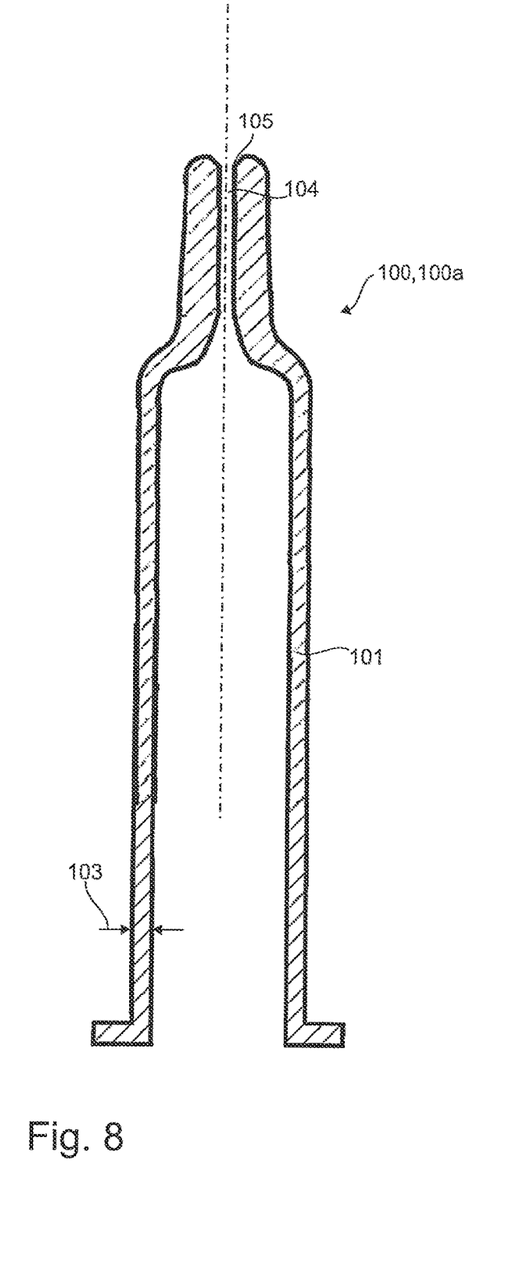
FIG. 8 is a sectional view of a hollow-shaped injection-moulded part according to another embodiment.

FIGS. 7 and 8 show an injection-moulded part (100) produced by the method or by using the apparatus (24). Such an injection-moulded part (100) is a syringe body (100a). The syringe body has a cone-shaped connecting element (104), which can be designed as a Luer cone. The cone-shaped connection element (104) corresponds to the second portion (102) of the injection-moulded part (100, 104). The connecting element (104) has an outlet opening (105), which is connected to the container (108) for the medium of the syringe. The first portion (101) of the injection-moulded part (100, 104) substantially corresponds to the container for the medium of the syringe. A finger flange (109) is provided on the container (108).

The second portion (102) of the injection-moulded part (100, 104) may only correspond to the connection element (104). However, it may additionally also include a portion of the container (108).

FIG. 7 also shows an embodiment in which the syringe body (100a) is equipped with a piercing means (19a), for example a needle or a cannula.

The second portion (102) of the injection-moulded part (100, 104) may only correspond to the connection element (104) with the piercing means. However, it may additionally also include a portion of the container (108).

According to a further preferred embodiment, the second portion is a piercing means, for example a needle or a cannula, which is overmoulded by the second plastic.

All the features disclosed in the application documents are claimed as being essential to the invention, provided that, individually or in combination, they are novel over the prior art.

LIST OF REFERENCE SIGNS 1 first female die tool
2 first mould cavity
3 mould core
4 first cavity
4a axial portion of the first cavity
4b radial portion of the first cavity
5 receiving element
6 second cavity
7 distance
8 shell surface of the mould core
9 inner wall surface of the mould cavity
10 first end portion of the mould core
11 second end portion of the mould core
12 receiving recess
13 second female die tool
14 second mould cavity
15 further injection mould tool
16 mould tool half
16a recess in the mould tool half
17 mould tool half
17a recess in the mould tool half
18 opening
19 insert component
19a piercing means
20 adapter element
21 first injection nozzle
22 hot runner
23 second injection nozzle
24 apparatus for producing a hollow injection-moulded part
25 first axial opening of the first mould cavity
26 second axial opening of the first mould cavity
27 protruding region of the second end portion of the mould core
28 end wall
29 end wall
30 holding device
31 inner surface of the second mould cavity
32 distance
33 inner wall surface of the second mould cavity
34 holding device
100 injection-moulded part
100a syringe body
101 first portion of the injection-moulded part
102 second portion of the injection-moulded part
103 wall thickness of the injection-moulded part
104 connection element
105 outlet opening
108 container for the syringe medium
109 finger flange
X axial direction
R radial direction

What is claimed is:

1. A method for producing a hollow injection-moulded part in a form of a primary packaging means for medical applications by an injection moulding method comprising:
    a) providing a first female die tool having a first mould cavity and a mould core formed as a male die tool, wherein in a cross-sectional view, a horizontal portion of the first mould cavity has a uniform shape from a left side to a right side;
    b) introducing the mould core into the first mould cavity, so that a first cavity is formed and the mould core protrudes beyond the first mould cavity in an axial direction (X) into the first female die tool and/or into a receiving element;
    c) injecting a first plastic material into the first cavity, so that a first portion of the hollow injection-moulded part is formed, wherein a top diameter of a cylindrical portion of the first portion of the hollow injection-moulded part is equal to a bottom diameter of the cylindrical portion of the first portion of the hollow injection-moulded part;
    d) transferring the first portion of the hollow injection-moulded part to a second cavity; and
    e) injecting a second plastic material into the second cavity, so that a second portion of the hollow injection-moulded part is formed directly on and is materially bonded to the first portion of the hollow injection-moulded part, wherein a flat surface of the first portion of the hollow injection-moulded part bonds with a flat surface of the second portion of the hollow injection-moulded part, wherein the second portion has an outlet opening, wherein the first portion and the second portion of the hollow injection-moulded part form a hollow primary packaging means in the form of a syringe body, a vial, an ampoule or a medical container, wherein a tempering device is provided in the first female die tool and in the receiving element, wherein an operative contact is a thermal contact, which occurs at a first end portion through a reception of the mould core in a receiving recess of the first female die tool and at a second end portion in the receiving element, and wherein a tempering of the mould core acts from both the first end portion and second end portion.

2. The method according to claim 1, wherein the mould core is of cylindrical design and is introduced centrally into the first mould cavity, so that a distance between a shell surface of the mould core and an inner wall surface of the first mould cavity define a wall thickness of the hollow injection-moulded part.

3. The method according to claim 1,
    wherein both the first and the second end portion protrude beyond the first mould cavity in the axial direction, and
    wherein the second end portion is in operative contact with the first female die tool and/or with the receiving element.

4. The method according to claim 1,
    wherein the receiving recess is arranged centrally to the first mould cavity.

5. The method according to claim 1,
    wherein the temperature of the mould core is controlled inductively, electrically or by means of a fluid.

6. The method according to claim 1, wherein the second cavity is formed by introducing at least one portion of the mould core into a second female die tool with a second mould cavity.

7. The method according to claim 1,
wherein a further injection mould tool has the second cavity,
wherein the further injection mould tool comprises two mould tool halves which are displaceable in relation to one another, and which have a recess,
wherein, in a closed state of the further injection mould tool, these recesses form the second cavity, and
wherein an opening is provided, through which a portion of the mould core and/or a predetermined region of the first portion of the hollow injection-moulded part can be introduced into the second cavity.

8. The method according to claim 1, wherein in step d), the first portion of the hollow injection-moulded part is transferred to the second cavity by means of the mould core.

9. The method according to claim 1, wherein before step d), the mould core is at least removed in sections from the first portion of the hollow injection-moulded part.

10. The method according to claim 1,
wherein in the second cavity, an insert component is arranged, which is overmoulded with the second plastic, and
wherein the insert component is a metallic insert component in the form of a piercing means.

11. The method according to claim 1, wherein in the second cavity, an insert component is arranged, which is provided with an adapter element, which is overmoulded with the second plastic.

12. The method according to claim 1, wherein the first plastic material is injected into the first cavity, and/or the second plastic material is injected into the second cavity via a respective hot runner.

13. The method according to claim 1,
wherein the first portion of the hollow injection-moulded part corresponds to at least a container for a medium,
wherein the second portion of the hollow injection-moulded part corresponds to a connection element or a connection element and a portion of the container, and
wherein the connection element has the outlet opening connected to the container.

\* \* \* \* \*